United States Patent [19]

Marquardt

[11] 4,237,007
[45] Dec. 2, 1980

[54] APPARATUS AND METHOD FOR THE THERMAL REGENERATION OF MATTER IN WATER TREATMENT PLANTS

[75] Inventor: Kurt Marquardt, Holzgerlingen, Fed. Rep. of Germany

[73] Assignee: EVT Energie- und Verfahrenstecknik GmbH, Stuttgart, Fed. Rep. of Germany

[21] Appl. No.: 933,800

[22] Filed: Aug. 15, 1978

[30] Foreign Application Priority Data

Aug. 24, 1977 [DE] Fed. Rep. of Germany ....... 2738120

[51] Int. Cl.³ ............................................. B01D 15/02
[52] U.S. Cl. ................................... 210/181; 210/189; 210/269
[58] Field of Search ................. 210/31 R, 32, 33, 268, 210/269, 181, 189

[56] References Cited

U.S. PATENT DOCUMENTS

| | | | |
|---|---|---|---|
| 2,614,657 | 10/1952 | Nicholson et al. | 210/33 |
| 2,631,727 | 3/1953 | Cichelli | 210/268 X |
| 3,298,950 | 1/1967 | Mindler | 210/33 |
| 3,595,784 | 7/1971 | Butterworth | 210/33 |
| 3,745,114 | 7/1973 | Dixson | 210/33 |
| 4,039,442 | 8/1977 | Kadlec | 210/32 |
| 4,124,528 | 11/1978 | Modezz | 210/32 |

FOREIGN PATENT DOCUMENTS 2029720 12/1971 Fed. Rep. of Germany.
1349078 12/1963 France.

*Primary Examiner*—John Adee
*Attorney, Agent, or Firm*—Kenyon & Kenyon

[57] ABSTRACT

Apparatus and methods are disclosed that provide a quasicontinuous thermal regeneration system for ion exchange resins and adsorption media ("matter") as used, for example, in desalinization processes, comprising an operating (desalinization) vessel, means for transferring measured amounts of matter there from to successive regeneration and cooling means and recycle back to the operating vessel. Heat exchange means are provided to transfer residual heat from the cooling step to the regeneration step, transport water is recycled in the process with minimal losses, and optional water softening and decarbonizing pre-treatment and chemical post-treatment steps may be included, the latter to remove dirt and heavy metals from the regenerated matter prior to recycle to the operating vessel.

1 Claim, 7 Drawing Figures

4,237,007

APPARATUS AND METHOD FOR THE THERMAL REGENERATION OF MATTER IN WATER TREATMENT PLANTS

BACKGROUND OF THE INVENTION

In recent years, thermally regeneratable ion exchange resins have been developed which are suitable for partial desalinization, softening and desalinization and the like of liquids, particularly water. These resins include active groups having weak acid or weak alkaline function in the same ion exchange resin structure (matrix). They are pre-loaded with acid or alkali, so that the resin operates at a neutral pH during loading and regeneration. Depending on whether bivalent calcium and magnesium ions or monovalent sodium and potassium ions are to be absorbed, the degree of pre-loading varies. The attainable useful volume capacity and the elutriability of the ions absorbed depends on the degree of pre-loading, the so-called XO-value.

Thermal regeneration of such resins has the advantage that no strong, corrosive chemicals are required and therefore the tanks necessary for the loading and regeneration of the resins need not be equipped with expensive, acid- and alkali-resistant corrosion-protective linings. Since hot water is used for the regeneration, no salinization of the regenerated resin occurs. The impact of such methods on the environment is substantially less than that of the conventional ion exchange desalinization processes. If waste heat is available, this process can be made very economical.

In spite of the above potential advantages of the thermal method, the use of these ion exchangers has not achieved satisfactory efficiency levels due to various system-related defects.

In the plants known to date (August Journal of Chemistry 1966, pages 589 to 608, or "Desalinization" 1973, pages 217 to 237 and 269 to 285), the loading and regenerating takes place discontinuously, according to customary ion exchange techniques, in exchange vessels in a batch system which, after the resin is charged, the vessels are taken out of operation, regenerated with hot water and are then returned into the process.

The thermally regeneratable ion exchange resins have only very little usable volume capacity, (0.2 to 0.3 val/$l_A$) wherein val represents one gram equivalent and $l_A$ represents one liter of exchange material whereby even at relatively low salt concentration in the raw water, a large quantity of ion exchange resin must be charged into the exchange vessels in order to obtain a sufficiently long working interval in relation to the regeneration time. This requirement, which is necessary for optimum operation, has adverse effects for several reasons:

The exchange vessels become very large and therefore, expensive. The large vessel volume of necessity requires large amounts of hot water for regeneration, as prior to each regeneration step, the cold water charge of the exchange vessel must be drained out and replaced by hot water or the cold vessel must be warmed up by additional hot water before the quantity of hot water required for the regeneration is introduced. Consequently, the heat utilization during the regeneration is relatively poor and the heat losses are high. Because of the large vessel volume and the large vessel surface, the heat losses during the regeneration are also considerable, so that, together with the disadvantages described above, only regeneration temperatures of 60° to 80° C. can be achieved with the batch system. However, the higher the temperature, the better is the regeneration effect. Preferred temperatures are up to 90° C.

Automating the system is very expensive.

It is characteristic of thermally regeneratable ion exchange resins that the water to be desalinated should contain as little calcium and magnesium as well as bicarbonate as possible. If water is to be treated which has a high content of these substances, it is necessary to include softening or decarbonizing as a pre-treatment stage. It is a disadvantage of the conventional batch processes that the ion exchangers for softening and decarbonizing which precede the desalinization process, must be regenerated separately with chemicals and that thereby the efficiency of the process with thermal regeneration is diminished.

It is a further characteristic of the thermally regeneratable resins that heavy metals absorbed therein are not removed by the thermal regeneration. Therefore, dirt and heavy metals should not be in the exchange resin before it is thermally regenerated. If these substances are nevertheless present, a special treatment of the resin must be performed at certain intervals, such as regeneration with chemicals. After this special treatment, however, a new adjustment of the XO-value is required, so that the resin can again be regenerated in the next operating cycle. It is a disadvantage of the batch method that the operating phase of the plant is interrupted for an extended period of time for the special treatment and the subsequent adjustment of the XO-value and no desalinization takes place.

It is a further disadvantage of the conventional batch method that, due to the discontinuous change between regeneration and operating condition and the different regeneration and operating times, the degree of possible heat recovery from the hot elutriate produced in the regeneration is substantially smaller than with the present quasi-continuous system. The heat of the hot elutriate produced in the regeneration could be utilized, for instance, for heating the raw water or the water which is used for the regeneration. Even with multi-line operation of a batch plant, heat utilization without expensive intermediate storage of the hot elutriate with corresponding heat losses is not possible, because the regeneration time of the system is only a fraction of the operating time of the columns, and therefore, heating of raw or regeneration water can take place only during the relatively short regeneration time. If such a plant is designed with only one line, heat utilization without intermediate storage of the hot elutriate is practically impossible, as the flow through the operating column is interrupted during the thermal regeneration.

The same above-mentioned difficulties arise also if thermally regeneratable and reactivatable adsorption media are used instead of thermally regeneratable ion exchange resins. In the description of the present invention, which relates to thermally regeneratable ion exchange resins as well as to thermally regeneratable adsorption media, the substance that is to be regenerated and transported is therefore called "matter" for the sake of simplicity.

SUMMARY OF THE INVENTION

It is an object of the invention to employ apparatus and a method for thermal regeneration, in which known quasi-continuous ion exchange systems, as exemplified by DT-AS 19 24 125, DT-PS 20 18 455, DT-AS 20 29

720, DT-AS 20 65 364, DT-AS 682, DT-AS 22 46 792 and DT-AS 24 03 274 are regenerated by means of chemicals such as hydrochloric acid and sodium hydroxide solution in special equipment in such a manner that they are suitable for thermal regeneration on a more or less continuous basis. Such quasi-continuous systems have substantial advantages, which will be described later, over the state of the art.

The object of the invention is achieved by utilizing a thermal regenerating column in association with an operating column, the former being interconnected with a cooling column, whereby the thermal regenerating column is connected via a circulating system (pump, line) to a heat exchanger in which the circulated liquid volume is heated up, while the cooling column is equipped with a similar system (circulating pump, line, heat exchanger), the circulated volume of liquid being cooled down in the heat exchanger associated with the column. The regenerating and cooling columns may be combined in a common vessel which is subdivided by an annular cold- and hot-water distributor into an upper cooling zone and a lower regeneration zone and a partial stream of water is taken out on one side of the distributor, is conducted by means of a circulating pump via a line through the heat exchangers for being heated up and is reintroduced on the side of the water distributor opposite the take-off point.

The heat exchange provides for the recovery of residual heat present in the hot regeneration water which exits from the regenerating column, by transferring the usable residual heat to the hot water being circulated to the operating column or vessel, and the residual heating to the temperature required in the operating column mentioned is accomplished by the heat exchanger which is supplied with a suitable heating medium.

A measuring column, the volume of which corresponds to the volume of the mass to be transferred to the regeneration/cooling (treatment) column, is interconnected between the operating column and the treatment column. The regenerating column, or the regenerating and cooling columns, may be preceded by a back-flushing column, the volume of which is larger than that of the measuring column. The back-flushing column is arranged between the measuring column and the regenerating column or the cooling and regenerating columns.

The measuring column may be followed by a separating column for separating masses of different density by back-flushing, thereby classifying them so that the separated masses may be delivered to separate regenerating columns, and the regenerating column or the regeneration and cooling columns may be preceded by one or several chemical treatment or regenerating columns.

The chemical treatment column or columns may be followed by one or more columns for restoring the pre-loading of the ion exchange matter required for the thermal regeneration.

Recovery devices operating with waste heat from the chemical regeneration may be provided for recovery of the chemicals and the regenerating and cooling columns may be followed by a further treatment column for sterilizing the regenerated and cooled matter by means of chemicals.

The development and the method of operating such apparatus for the thermal regeneration of matter as a quasi-continuous apparatus, as described above, has the following advantages:

Due to the external, batch-wise regeneration of the matter, a more optimized design of the regenerating apparatus is possible as to geometry as well as from the point of view of heat insulation and heat recovery. Because of the substantially smaller volume of the regenerating column, heat losses during regeneration can largely be avoided. The reason for the smaller volume of the regenerating column is that percentage-wise small portions of the total quantity of resin present in the plant are moved through the regenerating equipment in short time intervals and therefore, the volume of the quantity of resin to be regenerated is small. Due to the lower heat losses in the regeneration step, a better regeneration effect is obtainable and thereby, better heat utilization and therewith, a higher capacity of the matter in operating condition.

The elutriate running off from the regeneration step can be used to preheat the raw water, whereby likewise an improvement of the usable volume capacity in the operating column occurs. Also preheating of the water used for the regeneration by the running-off regenerate and heat utilization in the cooling of the regenerated hot resin before it is returned to the operating column is possible.

An optimum counterflow technique is possible, since due to the smaller diameter of the regenerating column, the hot water flows through the resin in a substantially more uniform manner and is more easily controllable than in the exchange vessel according to the state of the art, with its much larger diameter (danger of canal formation).

Because of the batch-wise feeding of freshly regenerated, and removal of loaded resin, the loading zone in the operating column of a continuous process is fixed at a given height with relatively only small fluctuations. In contrast, the loading zone in the exchange vessel according to the state of the art travels in the resin bed from top to bottom until ion slippage is detectable in the run-off from the filter. This is the reason why the degree of desalinization is subjected to greater fluctuations from the start of the operating cycle to the end of the cycle in the process according to the state of the art, than in the continuous process.

The external treatment of the matter makes it possible to perform special treatments and pre-treatments during the operation without appreciably disturbing the production of desalinized water or of treated solution. By deflecting the stream of matter into different treatment columns it is possible to perform the thermal regeneration alone as well as to carry out selectably the special treatment with the subsequent pre-treatment with or without back-flushing step prior to these two treatment operations.

In the thermal regeneration of ion exchange matter it is necessary to have partial desalinization or softening stages precede it in order to separate bi- and higher-valence ions ahead of the desalinization plant. If continuous techniques are employed similar to those for softening or partial desalinization, then the hot-water runoff of the thermal regenerating column can be combined with the regenerating column of the pre-treatment stage and the hot, highly sodium-containing elutriate of the thermal regeneration can find use for the regeneration of the pre-treatment stage. In the discontinuous mode of operation according to the state of the art, such a connection is not possible or only with great complications. This measure likewise increases the efficiency of the quasi-continuous method.

If a solvent treatment of the matter in combination with the thermal or chemical regeneration is employed, then the quasi-continuous method also has considerable technical and economic advantages. As many solvents are harmful to the environment and must not be vented to the air or disposed in the water, or only in small traces, such a solvent treatment should advantageously be combined with the recovery step. The solvent which contains the elutriated substances is then distilled, the solvent vapor produced is condensed and is used over again as a purified solvent for the elutriation.

With the quasi-continuous thermal regeneration which proceeds in conjunction with the solvent elutriation, the waste heat produced from the hot elutriation solution or the condensate can advantageously be used for the distillation of the solvent. As the solvent feed and the runoff from the treatment column is quasi-continuous, expensive intermediate storage tanks, which are necessary with a discontinuous method, can be dispensed with and the solvent to be treated and recovered can be introduced directly into the recovery plant.

The use of a separating column permits the mixing, for instance, of thermally regeneratable ion exchange resin with an inert adsorption medium and the separation of these subsequently in the separating column by back-flushing, classifying them if the density difference is great enough. Thus, the ion exchange resin, for instance, can then be thermally regenerated and the adsorption medium can be treated with solvent. It is further possible to use thermally regeneratable ion exchange resin with ion exchange resin that is chemically regeneratable, as a mixture, to separate the two resins and to regenerate them then separately.

The efficiency of the method can further be improved substantially if waste heat is used for the thermal regeneration and/or the solvent recovery. If the temperature gradient available in the waste heat is too small for normal heat exchange, a heat pump can be used to advantage.

This embodiment is distinguished by a particularly compact design.

The interposition of a measuring column between the operating column, a subsequent back-flushing, treatment or regenerating column, for masses with little specific loading or ion exchange resin of low capacity, makes it possible to balance the matter drawn from the operating column for regeneration to the amount of regenerated matter which is being fed to the operating column. If too much matter is removed from the operating column in cycling, relocations in the mass bed occur, which lead to a decrease in the treatment efficiency.

The measuring column can be operated (a) discontinuously, where small mass charges can be conveyed into the measuring column at short time intervals which are shorter than the cycling times in the treatment column. When the measuring column is filled, which must occur within the cycling time of the external columns, then the entire mass is cycled from the measuring column into the following treatment column;

(b) continuously, where a small mass flow is maintained from the operating column into the measuring column, while the mass is quasi-continuously withdrawn from the measuring column according to the cycling times in the treatment columns.

The buffer effect of the measuring column ensures that sufficiently large amounts of matter, which correspond to the loading of the bed in the operating column per unit time, are drawn without degradation of the treatment effect by relocations in the mass bed of the operating column.

DETAILED DESCRIPTION

Figure 1:
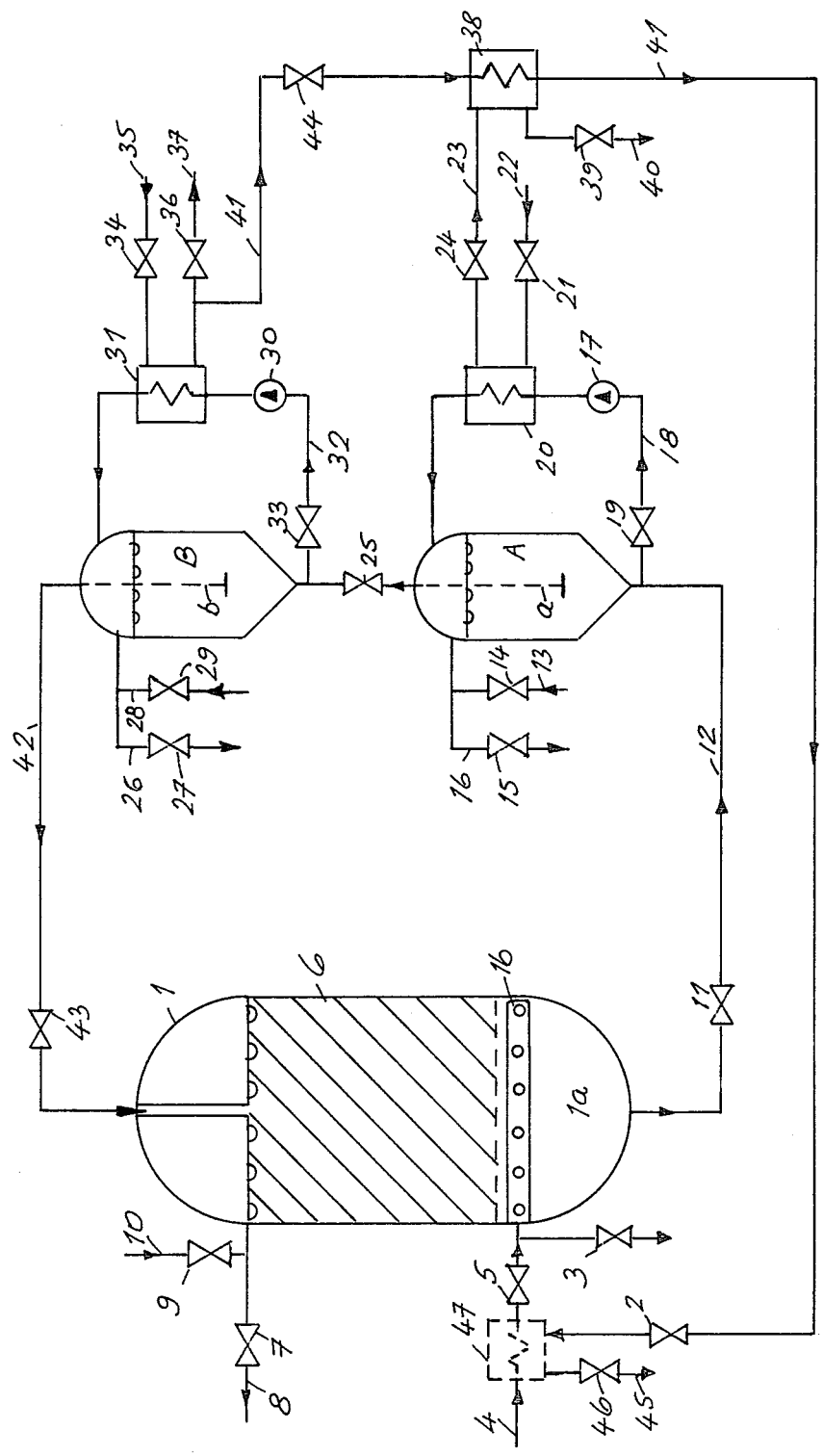
FIG. 1 is a schematic flow sheet showing separate regenerating and cooling columns.

In the plant according to FIG. 1, matter 6 (e.g., ion-exchange resin) to be regenerated is cycled from operating (e.g., desalinization) column 1 into the regenerating column A via line 12 by closing operating valves 5 and 7 and opening valves 9, 11 and 15, interrupting the flow of raw water into operating column 1.

Transport of matter 6 is accomplished by feeding transport water into the operating column 1 via line 10 and open valve 9 and relieving regenerating column A via line 16 and open valve 15.

A further possibility of removing the matter from the operating column is to lower the mass bed in the operating column, first interrupting the throughflow by closing operating valves 5 and 7 in lines 4 and 8, by opening valve 9 and feeding transport water via line 10, with valve 3 open, so that part of the matter is pushed into the empty space 1a below raw water distributor 1b of operating column 1. Transport water fed-in via line 10 with valve 9 open is discharged again from operating column 1 via valve 3. After valve 9 is closed, raw water valve 5 is opened and the mass charge is conveyed into regenerating column A under raw water pressure with valve 11 open, via line 12 and, with regenerating column A being relieved via valve 15 in line 16. The valves 15 and 11 are closed again and, after freshly regenerated mass charge is fed into operating column 1 (as described later), valve 7 in line 8 is opened and raw water is conducted through matter 6 upstream via open valve 5 through line 4 and raw water distributor 1b, and is discharged as treated (desalinized) water via open valve 7 in the line 8.

Regenerating column A filled with matter 6 and transport water is brought to the necessary regeneration temperature by circulating the transport water by means of pump 17 via line 18, with valve 19 open via heat exchanger 20. The heat can be supplied to heat exchanger 20 by steam, hot water, electric energy, etc. If heat is supplied by hot steam or hot water, the hot medium is fed to heat exchanger 20 via line 22 with valve 21 open and discharged via line 23 with valve 24 open.

For utilizing the heat that is still contained in the heating medium discharged from heat exchanger 20 via line 23, this medium is conducted into a further heat exchanger 38, which is installed in the cooling water discharge line 41 of heat exchanger 31 of cooling column B. This cooling water is admixed via line 41 with valve 2 open, with the raw water in line 4 and transfers sensible heat to the latter.

The heating medium exiting from heat exchanger 38 via line 40 with valve 39 open can, to the extent that it is hot water or condensate, be stored for further utilization of the residual heat in an insulated interim tank (not shown) and used as transport water for operating column 1. The transport water is fed in, as described above, via line 10 with valve 9 open, for carrying out the resin transporting step. By feeding in warm water, matter 6 is at least partially warmed up during the transporting process, so that less heat need to be supplied in regenerating column A for reaching the desired regeneration temperature.

After regeneration is completed, matter 6 is transported from regenerating column A into cooling column B by opening valves 14, 25 and 27. The matter is transported by feeding cold transport water via line 13, with valve 14 open, into regenerating column A and relieving cooling column B via line 26, with valve 27 open. Thereupon, valves 14, 25 and 27 are closed. The transport water running out of line 26 is returned to the raw water tank (not shown). This applies to all transport operations so that practically no transport water loss occurs in the system.

The matter 6 and the water volume contained in cooling column B are cooled down by circulating the water by means of pump 30 in line 32 via heat exchanger 31 with valve 33 open. As coolant, cold raw water can be supplied to heat exchanger 31 via line 35 with valve 34 open.

The coolant then runs via line 41 and open valve 44 to the heat recovery described above through heat exchanger 38. If raw water cannot be used, other media such as salt brine or liquified gases such as liquid ammonia or organic coolants can be used. In that case, the coolant warmed up in heat exchanger 31 is not fed directly into the raw water but heat exchanger 47, shown in dashed lines, is used, which is arranged in raw water line 4 and into which the coolant is fed with valve 2 open via line 41 and, with valve 46 open, is discharged via line 45. The cooled-down coolant can then be conducted into an intermediate tank (not shown) and returned to heat exchanger 31 via line 35 with valve 34 open.

If heat recovery from cooling column B is to be dispensed with entirely, then the coolant can be discharged via line 37 with valve 36 open.

After it is cooled down, matter 6 is transported from cooling column B into operating column 1 by opening 29 in line 28 and valve 3 at operating column 1 via line 42, with resin transport valve 43 open. The matter is transported by feeding cold transport water into cooling column B via line 28 with valve 29 open, and the transport water is discharged into the raw water tank (not shown) via valve 3 at operating column 1. While the matter is being transported, it is necessary to interrupt the treatment process in operating column 1, which is accomplished prior to the start of the described resin transport by closing valve 5 in line 4 (feed line) and valve 7 in line 8 (discharge line). After the transport of the matter is completed, valves 29, 43 and 3 are closed and operating column 1 is set in operation again by opening valves 5 and 7.

Figure 2:
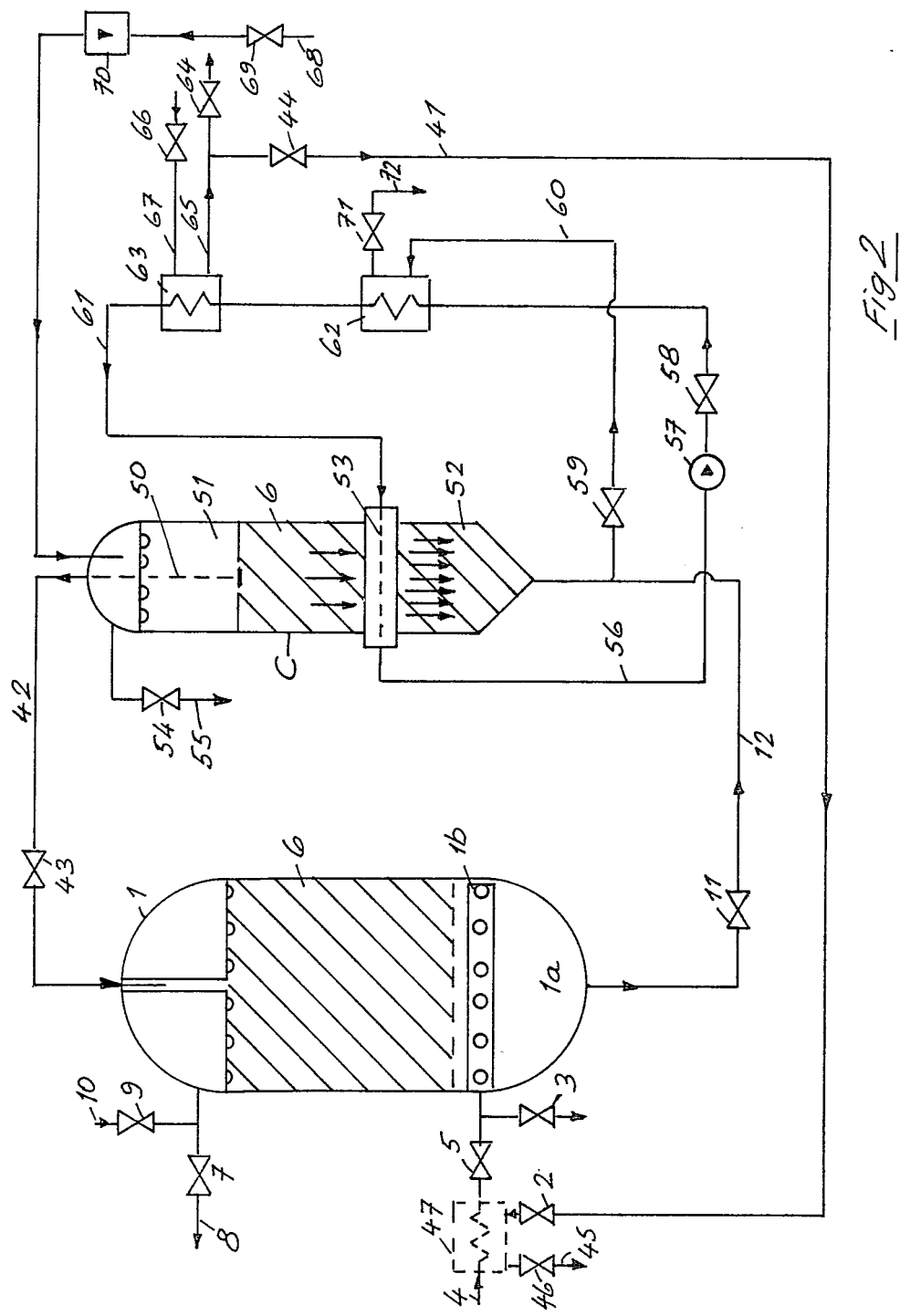
FIG. 2 is a schematic flow sheet showing a combined regenerating and cooling column.

In the plant according to FIG. 2, matter 6 to be treated is cycled, as previously described with respect to FIG. 1, from operating column 1 into combined regenerating and cooling column C and, after the regeneration has taken place, is returned into operating column 1 by means of transport water. The measuring of the resin charge in cooling part 51 of the regenerating and washing column C is accomplished (as in the separate regenerating and cooling columns A and B of FIG. 1, which employ respective immersion tubes a and b of FIG. 1) by immersion tube 50 (FIG. 2) the immersion depth of which into the column determines the transport mass volume.

The content of regenerating and cooling column C is brought to the desired regeneration temperature by circulating the water volume present in the column by means of pump 57, with valve 58 open, via lines 56 and 61 through heat exchangers 62 and 63. Heat exchanger 63 provides the primary heat and is heated with steam, hot water, electric energy, etc., while heat exchanger 62 serves for secondary heat recovery from the regeneration waste water exiting from line 60.

Cold water is fed into upper cooling space 51 of the regenerating and cooling column C via line 68, with valve 69 open. In flowing down through the cooling space, the cold water is mixed at the hot-water distribution system 53 with the hot circulating water heated up by means of heat exchangers 62 and 63. A mixture temperature is set which corresponds to the regeneration temperature desired in regeneration chamber 52 of column C. The hot water flows through the part of the matter which is contained in the regenerating chamber and is discharged via line 60, with valve 59 open, for heat recovery via heat exchanger 62 and from there via line 72 with valve 71 open.

With the above arrangement, the part of the matter contained in regeneration zone 52 below hot water distribution system 53 is brought to the regeneration temperature, while simultaneously the part of the matter located above the hot water distributor is cooled by the inflowing cold water, the portion of which is metered by flow meter 70 in line 68. Flow meter 70 serves at the same time for setting the cold water portion which gets to the hot water distributor, so that the necessary regeneration temperature in the regeneration zone 52 can be controlled.

The heating medium which is fed into heat exchanger 63 via line 67 with valve 66 open, and which flows out of the heat exchanger via line 65, has residual heat. This residual heat can be recovered if the medium is conducted, with valve 44 open, via line 41 and with valve 2 open either into heat exchanger 47 which is arranged in the raw water line and is shown dashed, or if hot water is used as the heating medium, this is fed directly without heat exchange into the raw water via line 41.

After the regeneration is completed, the matter 6 is recycled from regenerating and cooling column C via line 42 into operating column 1 by opening resin transport valve 43 in line 42 and expansion valve 3 from operating column 1, with valve 69 in line 68 open. The transporting process is accomplished by feeding transport water into line 68 and discharging the same via valve 3 at operating column 1. During the transporting process, the circulation process by the pump 57 via heat exchangers 62 and 63 as well as lines 56 and 61 is interrupted. After pump 57 is shut down, valve 58 as well as the valves for the heating medium supply of heat exchangers 62 and 63 are closed.

The resin transporting processes between cooling and regenerating column C and operating column 1 proceed so that during the regeneration and cooling process, column C is filled with matter only to the lower end of the immersion tube 50. After the cooling and the regeneration are completed, loaded resin is cycled from operating column 1 into regenerating part 52 of cooling and regenerating column C. Regeneration zone 52 must be designed so that it just takes the mass volume drawn from the operating column 1. By transporting loaded matter into the regeneration zone 52 of the column, the regenerated resin contained therein is pushed upward and the previously empty part of the column is filled with cooled matter. This cycle is followed by the cycle of transporting the matter from the cooling and regenerating column C back into the operating column 1.

If the desalinization process with thermal regeneration is preceded by softening as pre-purification and for removing bivalent ions, and if this stage is likewise designed with a quasi-continuous technique, then the highly salt-containing regenerate exiting from heat exchanger 62 via line 72 with valve 71 open, from regeneration zone 52 of regenerating and cooling column C, can advantageously be used for regenerating the softener. This regeneration runoff is then fed to the regenerating and washing column of the quasi-continuous softening unit and thereby, a considerable reduction in consumption of the regeneration medium in the pre-purification stage is achieved.

Figure 3:
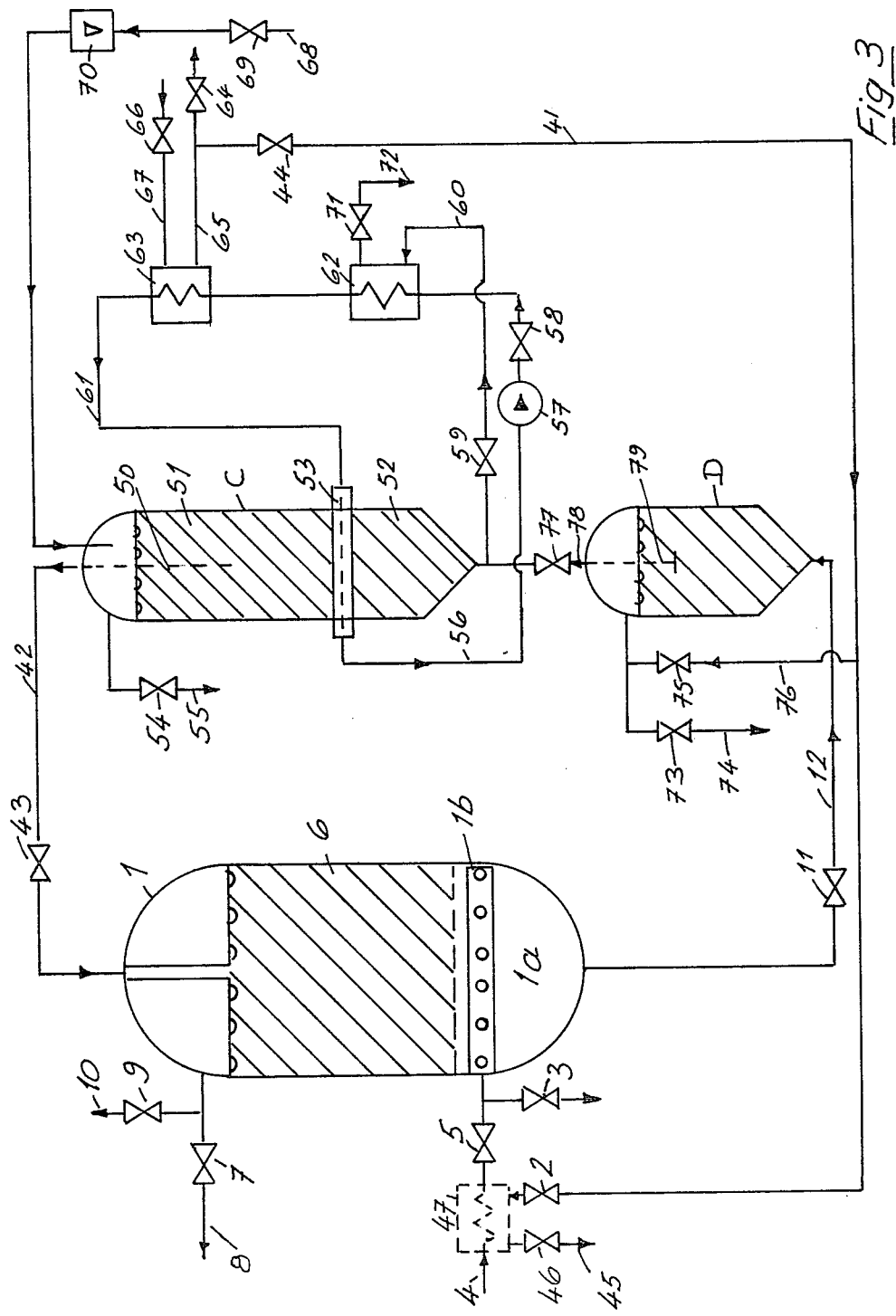
FIG. 3 is a schematic flow sheet showing the combined regenerating and cooling column preceded by a measuring column.

In the plant according to FIG. 3, an additional measuring column D is associated with the apparatus of FIG. 2 as shown. As already described above, measuring column D has the purpose of reducing the volume of matter drawn from operating column 1 per unit time in such a manner that no channeling occurs within mass bed 6 in operating column 1, which could have an adverse effect on the treatment effect of the process.

If the mass volume transported exceeds 10% of the matter contained in the operating column, channeling is to be expected. Measuring column D can be operated as follows. The loaded matter is transported into measuring column D in transport water by opening valves 9 in line 10 and 11 in line 12 and 73 in line 74. The mass volume transported into column D is a fraction of the resin charge transported from measuring column D into cooling and regenerating column C, and the same amounts of matter per unit time are transported from operating column 1 into measuring column D, as are transported from cooling and regenerating column C back into operating column 1. To achieve this, the number of transports of matter from operating column 1 into measuring column D into column C takes place only when measuring column D occurs more frequently than from measuring column D into cooling and regenerating column C. The mass transport from measuring column D is completely filled and specifically, after valves 11 in line 12, 73 in line 74 and 9 in line 10 are closed.

For transporting, valves 75 in line 76, 77 in line 78 and 54 in line 55 are opened. For transporting, hot or warm transport water is advantageously fed into measuring column D via valve 75 in order to avoid cooling down the matter in regeneration zone 52 of the cooling and regenerating column. For this purpose, for instance, hot water from the exit of heat exchanger 63 can be used, which is fed into column D via line 41, with valve 44 open, and via lines 41 and 76 through open valve 75. After the transport is completed, valves 75 in line 76, 77 in line 78 and 54 in line 55 are closed. In cooling and regenerating column C, the cooling and regeneration cycle then begins, while measuring column D is refilled from operating column 1 in several transport operations.

Another possibility to operate measuring column D is not to transport the matter from operating column 1 into measuring column D with an increased number of transports, but to draw the matter continuously from the operating column 1 in the time between the transport operations from column D into column C. This procedure has the advantage that the operation in operating column 1 is not interrupted so often and the output of the desalinization plant is therefore greater. For this purpose, operating column 1 is filled almost completely with matter, i.e., including the empty space 1a below the raw water distributor 1b; the matter 1a is contained only loosely and remains in motion. With valves 5 in line 4 and 7 in line 8 open, i.e., during the operating cycle of operating column 1, valves 11 in line 12 and 73 in line 74 are open. Valve 11 is equipped with a setting device (not shown), by which the free opening cross section can be regulated and through appropriate regulation a mass water suspension is conducted into measuring column D in a continuous stream via line 12 under the pressure of the raw water. When measuring column D is full, then the withdrawal of matter from operating column 1 is automatically stopped and, as described above, valve 11 in line 12 and valve 73 in line 74 are closed, transport water is fed-in via valve 75 in line 76; matter is withdrawn via immersion tube 79 and transported via valve 77 in line 78 into cooling and regenerating column C.

The treatment steps such as back-flushing, chemical treatment, thermal regeneration, solvent treatment, etc. described above can advantageously be combined in continuous processes. Such combinations are shown in FIGS. 4 through 7.

Figure 4:
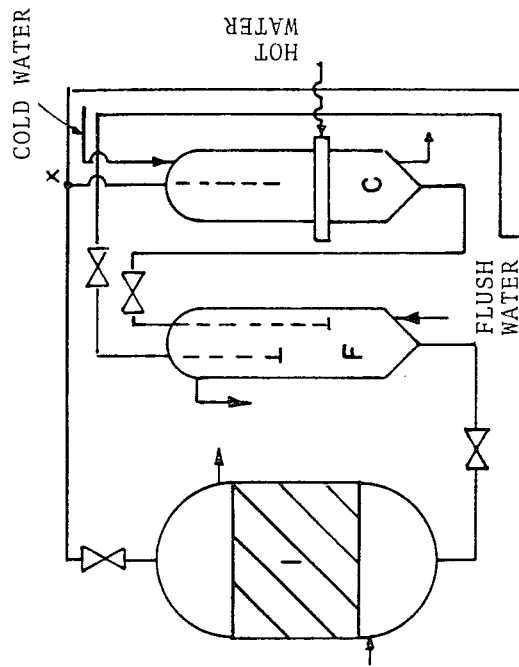
FIG. 4 is a schematic flow sheet showing the operating column followed by a regenerating column, a cooling column and then a combined post treatment regenerating and washing column.

In the plant according to FIG. 4, operating column 1 is connected to hot-water regenerating column A and the latter to cooling column B. Thereupon, the matter is post-treated in regenerating and washing column E by adding chemicals such as acids and alkaline solutions or sterilizing chemicals such as formaldehyde or the like, and is then cycled back into operating column 1. Especially in the treatment of drinking water or of utility water for medical or pharmaceutical purposes, this method has the advantage that simultaneous sterilization of the matter is possible, which assures that a largely germ-free desalinized water is obtained.

Figure 5:
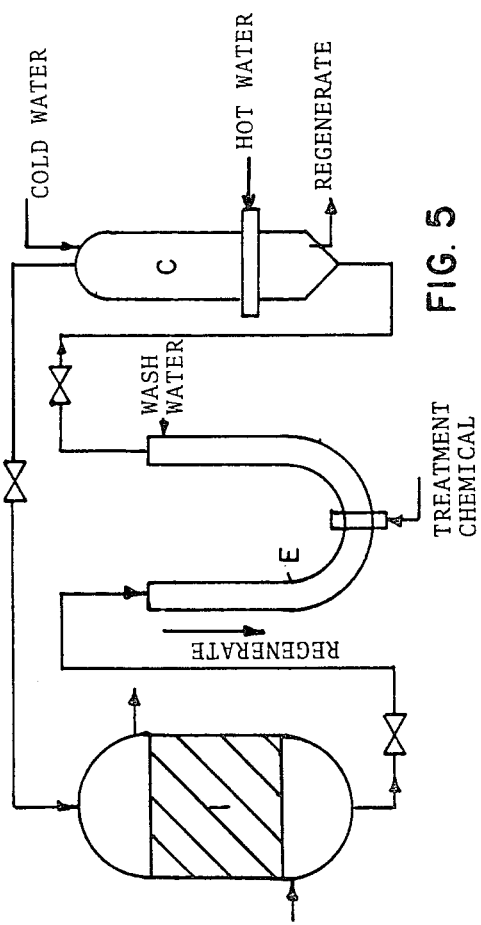
FIG. 5 is a schematic flow sheet showing an operating column followed by a regenerating and washing column, followed by a cooling and regenerating column.

In the plant according to FIG. 5, operating column 1 is followed by regenerating and washing column E, in which the matter can be treated by the dosed addition of chemicals. This column is followed by cooling and regenerating column C, from which the regenerated matter is cycled back into operating column 1. With this process combination, the thermally regeneratable ion exchange resin, for instance, can be pre-loaded in regenerating washing column E in order to achieve optimum thermal regeneration. Moreover, a special chemical treatment for removing loading substances which cannot be elutriated in the thermal regeneration is further possible in this column. If no chemicals are fed into the regenerating and washing column at the ring distributor, but this column is used only for treatment with a solvent, then substances which are removed from the matter by this solvent can be separated before the matter is hot-regenerated. Thus, a separation of certain substances from other matter contained therein can be realized with the method.

Figure 6:
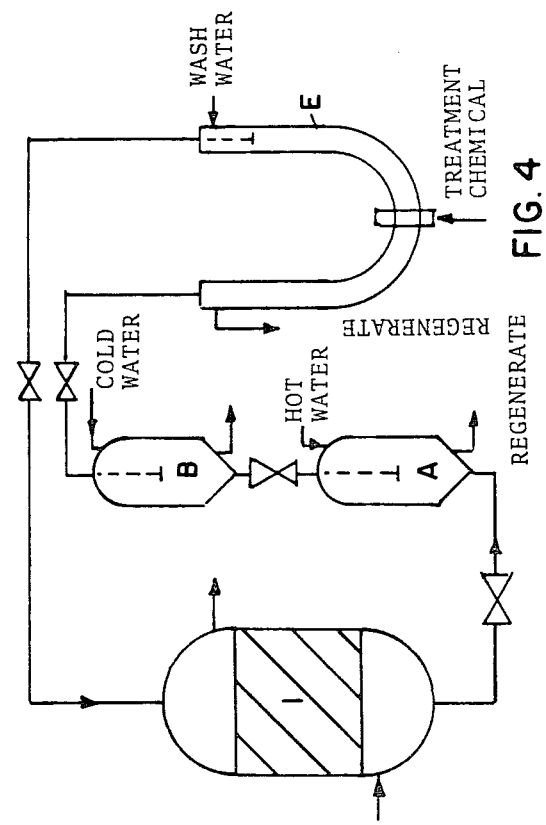
FIG. 6 is a schematic flow sheet showing an operating column followed by a separating column, then a cooling and regenerating column and a post-treatment regenerating washing column.

In the plant according to FIG. 6, operating column 1 is followed by separating column F which contains two immersion tubes of different lengths. If a mixture of matter is present in operating column 1, then this matter can be classified and separated in separating column F, by back-flushing with water, at different heights of the separating column. The separated masses are transported individually for regeneration, where, for instance, separating column F is followed in parallel by one cooling and thermal regeneration column C and regenerating and washing column E, respectively. This method makes it possible to mix chemically and thermally regeneratable matter, to separate it outside operating column 1 and to regenerate the thermally regeneratable component in column C and the chemically regeneratable component in column E. Both masses are transported to operating column 1 via separate mass transport lines; they are mixed together at point X, so that the mixture of matter gets into the operating column 1 again ready for use. The regeneration step in column G can, of course, also be carried out separately on two thermally regeneratable masses if they have different densities. The regenerating and washing column E is then replaced by an additional cooling and thermal regeneration column C.

Figure 7:
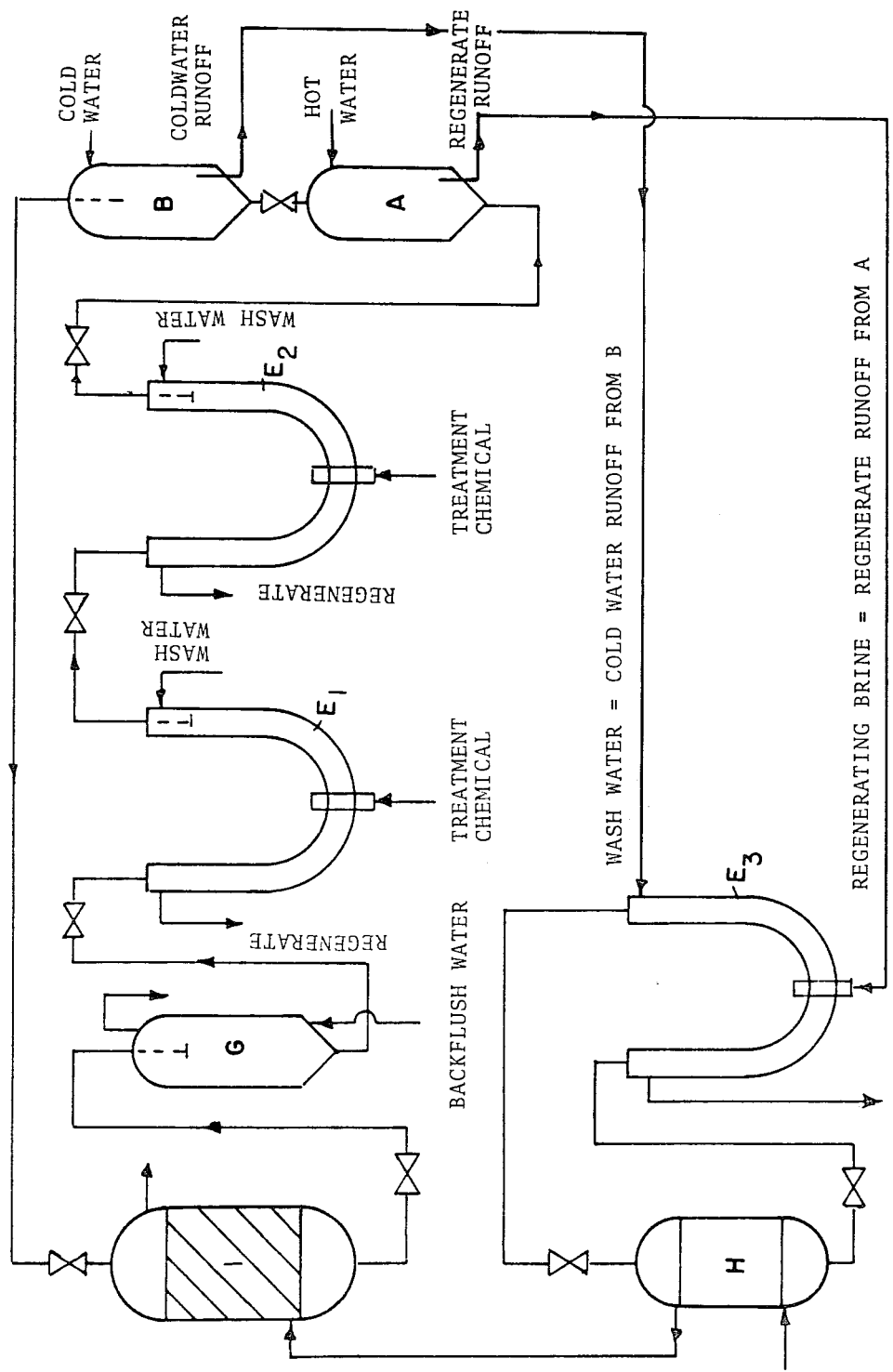
FIG. 7 shows apparatus with an operating column followed by back-flushing, regenerating and washing columns, as well as pre-treatment softening, regenerating and washing columns.

In the plant according to FIG. 7, operating column 1 is followed by a back-flushing column G, in which substances which can be removed by back-flushing are flushed from the surface of the matter. In a regenerating and washing column $E_1$ which follows the back-flushing column G, a treatment of the matter with chemicals can be performed. In a second regenerating and washing column $E_2$, which follows column $E_1$, the chemical treatment can be supplemented with a second chemical treatment. Both columns $E_1$ and $E_2$ can also serve to adjust the so-called XO-value of the thermally regeneratable ion exchange resin; the resin is first loaded with an acid and an alkali solution. The regenerating and washing column $E_2$ is followed by a column for thermal regeneration A, from which resin is then conducted into cooling column B and is recycled from there into operating column 1. If the plant contains a pre-conditioning or pre-purification stage in the form of a quasi-continuous softener H, then a cooling water and regeneration agent recovery step can advantageously be carried out, as shown in FIG. 7. The hot regenerate runoff from column A, which contains large amounts of neutral salts, is fed as regenerating brine into the regeneration agent distributor of the regenerating and washing column $E_3$ of the pre-purification stage. The cooling water from the cooling column B is fed as wash water to the head of the regenerating and washing column $E_3$ of the pre-purification stage. The ion exchange resin regenerated there is then recycled into the softener column H, the runoff of which serves as feed water for the desalinization column 1 of the plant with thermally regeneratable ion exchange resin.

What is claimed is:

1. Water treatment apparatus including an operating column for containing particulate treatment matter and treatment means for regenerating said matter, said treatment means including a regeneration column, a supply conduit having an inlet connected to the operating column and an outlet communicating with the regeneration column, a return conduit having an inlet communicating with the regeneration column and an outlet connected to the operating column, means for supplying aqueous transport liquid under pressure for transporting spent matter from the operating column through the supply conduit for delivery to the regeneration column, and means for supplying aqueous transport liquid under pressure for transporting matter regenerated in the regeneration column through the return conduit to the operating column, wherein the improvement comprises said treatment means further including:
a closed heating circulation loop connected to the regeneration column;
pumping means in said heating circulation loop for circulating aqueous transport liquid from the regeneration column through said loop;
heat exchanger means in said heating circulation loop for heating the aqueous transport liquid being circulated through the loop to a temperature sufficient to provide a predetermined regeneration temperature in said regeneration column;
a cooling column located between the regeneration column and the inlet to said return conduit; and
means for supplying a flow of aqueous cooling liquid to said cooling column for cooling heated matter from the regeneration chamber before said regenerated matter is transported back to the operating column, wherein
said cooling and regeneration columns comprise upper and lower zones, respectively, in a single vessel, and said treatment means further comprises a ring-shaped distribution means disposed in said vessel between the upper cooling zone and the lower regeneration zone, said heating circulation loop having an inlet connected at a take-off point on one side of the distribution means and an outlet connected at a reintroduction point on the opposite side of the distribution means from the take-off point,
said means for supplying a flow of aqueous cooling liquid is connected to the vessel above the cooling zone for flow downward through the cooling zone, and
said treatment means further comprises:
a second heat exchanger means in said heating circulation loop located upstream of said first-mentioned heat exchanger means and
a conduit having an inlet connected to said vessel below the regeneration zone and an outlet connected to said second heat exchanger means for delivering aqueous regeneration waste liquid for preheating the aqueous liquid withdrawn from the take-off point of said distribution means before its entry into said first-mentioned heat exchanger means.

* * * * *

UNITED STATES PATENT AND TRADEMARK OFFICE
CERTIFICATE OF CORRECTION

PATENT NO. : 4,237,007
DATED : December 2, 1980
INVENTOR(S) : Kurt Marquardt

It is certified that error appears in the above—identified patent and that said Letters Patent is hereby corrected as shown below:

Col. 10, lines 62-63 after "regenerating" insert --and--.

Col. 11, line 27, change "G" to --C--.

Signed and Sealed this

Seventeenth Day of March 1981

[SEAL]

Attest:

RENE D. TEGTMEYER

Attesting Officer     Acting Commissioner of Patents and Trademarks

UNITED STATES PATENT AND TRADEMARK OFFICE
CERTIFICATE OF CORRECTION

PATENT NO. : 4,237,007
DATED : December 2, 1980
INVENTOR(S) : Kurt Marquardt

It is certified that error appears in the above—identified patent and that said Letters Patent is hereby corrected as shown below:

Change assignee from "EVT Energie- und Verfahrenstecknik GmbH, Stuttgart, Fed. Rep. of Germany"

to --Hager & Elsässer GmbH, Stuttgart, Fed. Rep. of Germany--

Signed and Sealed this

Fourteenth Day of June 1983

[SEAL]

Attest:

DONALD J. QUIGG

Attesting Officer     Acting Commissioner of Patents and Trademarks